(12) United States Patent
Finney et al.

(10) Patent No.: US 8,029,300 B2
(45) Date of Patent: Oct. 4, 2011

(54) CONNECTOR AND SYSTEM FOR CONNECTORS

(75) Inventors: Benjamin Michael Finney, Rolling Meadows, IL (US); Paul John Kudrna, Rolling Meadows, IL (US); Markus Thrien, Bochum (DE)

(73) Assignee: Research In Motion Limited, Waterloo, Ontario ( * ) Notice: Subject to any disclaimer, the term of this patent is extended or adjusted under 35 U.S.C. 154(b) by 0 days.

(21) Appl. No.: 12/572,906

(22) Filed: Oct. 2, 2009

(65) Prior Publication Data

US 2011/0081790 A1    Apr. 7, 2011

(51) Int. Cl.
*H01R 12/00* (2006.01)

(52) U.S. Cl. ..... 439/136; 439/500; 345/558; 345/550.1; 345/575.8; 345/575.1

(58) Field of Classification Search ............... 455/558, 455/550.1, 575.8, 575.1; 439/136, 500
See application file for complete search history.

(56) References Cited

U.S. PATENT DOCUMENTS

| | | | |
|---|---|---|---|
| 4,865,321 A | 9/1989 | Nakagawa et al. | |
| 5,814,805 A | 9/1998 | Reichardt et al. | |
| 6,116,509 A | 9/2000 | Angelo et al. | |
| 6,244,894 B1 * | 6/2001 | Miyashita | 439/500 |
| 6,343,018 B1 | 1/2002 | Takeyama et al. | |
| 6,964,576 B2 * | 11/2005 | Crutchfield | 439/142 |
| 7,023,692 B2 * | 4/2006 | Mansutti et al. | 361/679.56 |
| 7,079,875 B2 * | 7/2006 | Robertson, Jr. | 455/575.1 |
| 7,512,397 B2 * | 3/2009 | Liu et al. | 455/347 |
| 7,597,566 B2 | 10/2009 | Peiker | |
| 7,764,977 B2 * | 7/2010 | Kemppinen | 455/558 |
| 7,797,818 B2 * | 9/2010 | Saboune | 29/718 |
| 2003/0134602 A1 * | 7/2003 | Haga et al. | 455/90 |
| 2003/0186570 A1 | 10/2003 | Ito | |
| 2008/0096412 A1 | 4/2008 | Poh et al. | |
| 2008/0318644 A1 * | 12/2008 | Holmes et al. | 455/575.1 |
| 2009/0312504 A1 * | 12/2009 | Lorenz et al. | 526/80 |

FOREIGN PATENT DOCUMENTS

| | | |
|---|---|---|
| EP | 0 688 067 | 6/1995 |
| EP | 1148694 A1 | 10/2001 |

OTHER PUBLICATIONS

Extended European Search Report, EP Application No. 09172155.5, Apr. 1, 2010.
Geoff Gasior, Gigabyte's i-RAMm storage device, web article, Jan. 25, 2006, www.techreport.com/articles.x/9312.
Nokia, Interactive Demonstration N90, Inserting the SIM card, 2006, http://nds.nokia.com/tutorials/support/nam/phones/n90/us_english/index.html, (last visited Dec. 18, 2009).
European Search Report for EP App. No. 09172155.5, dated Jun. 30, 2011.

* cited by examiner

*Primary Examiner* — Gary F. Paumen
(74) *Attorney, Agent, or Firm* — Novak Druce + Quigg LLP (57) ABSTRACT

A connector and a system for connectors of a mobile device wherein the connector is angled, that is, wherein the connector includes an external interface for receiving an external connection and an internal interface configured for connection to a printed circuit board, wherein the internal interface is connected to the external interface and the internal interface is at a predetermined angle with respect to the external interface. In a mobile device, the external interface is at an angle to a main printed circuit board of the mobile device.

14 Claims, 9 Drawing Sheets

CONNECTOR AND SYSTEM FOR CONNECTORS

FIELD

This application relates to a connector and a system for connectors and, in particular, to connectors and systems for connectors for removable cards, such as memory cards or SIM cards, or for external accessories or devices such as charging plugs, headsets, audio cables, and the like that are used in a mobile device.

BACKGROUND

Mobile communication devices are in use throughout everyday life. One common aspect of the design and development of mobile communication devices is that there is an ongoing movement to reduce the size of devices and to provide increased functionality even though the size is being reduced.

One of the ways of providing additional functionality is the use of insertable cards that can be inserted into the mobile device to provide, for example, subscriber information (such as Subscriber Identity Module (SIM) cards) or additional memory that can be removed and replaced. Such insertable cards having additional memory may simply provide additional memory storage capacity, for example, either empty memory storage or containing multimedia files such as images, videos, audio or the like, or may provide additional functionality, for example, via software on the insertable card.

Conventional attempts to include insertable cards in mobile communication devices include the availability of either: a) a card slot in which the insertable card is inserted into a slot and is spring loaded to be released from the slot; or b) a card sleeve, in which the card is inserted into the sleeve and the sleeve is then folded into place within the mobile device. In this later case, the card sleeve is often placed beneath a cover, such as a battery cover of the mobile device.

These conventional solutions can present problems with regard to difficulties in reducing the overall dimensions of the mobile device or with the user accessing the insertable cards in order to change the card.

BRIEF DESCRIPTION OF THE DRAWINGS

For a better understanding of the embodiments described herein and to show more clearly how they may be carried into effect, reference will now be made, by way of example only, to the accompanying drawings which show the exemplary embodiments and in which:

FIG. 3 is a block diagram of an exemplary embodiment of a node of a wireless network that the mobile communication device of FIG. 1 may communicate with;

DETAILED DESCRIPTION

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

According to an aspect herein, there is provided a connector for a mobile device. The connector includes an external interface for receiving an external connection and an internal interface configured for connection to a printed circuit board, wherein the internal interface is connected to the external interface and the internal interface is at a predetermined angle with respect to the external interface.

In a particular case, the connector may be a removable card connector and the external interface may be a card slot. In another case, the connector may be a USB connector and the external interface may be a USB port. It will be understood that other connectors such as SIM card readers, headphone jacks, power connectors and the like may also be included.

In another particular case, the predetermined angle may be measured between a plane perpendicular to the external interface and a plane parallel to the internal interface and the angle may be between approximately 5 and 85 degrees. In a more particular case, the predetermined angle may be between approximately 15 and 30 degrees or, further, between approximately 18 and 20 degrees.

In still another particular case, the external interface may be provided by a conventional connector and the internal interface may be provided by a daughter printed circuit board connected to the conventional connector.

According to another aspect herein, there is provided a mobile device comprising a main printed circuit board and a connector for receiving an external connection, the connector including: an external interface for receiving the external connection; and an internal interface configured for connection to the main printed circuit board, wherein the internal interface is connected to the external interface and the external interface is at a predetermined angle with respect to the main printed circuit board.

In a particular case, the predetermined angle may be measured between a plane perpendicular to the external interface and a plane parallel to the main printed circuit board and the predetermined angle may be between approximately 5 and 85 degrees. In a more particular case, the predetermined angle may be between approximately 15 and 30 degrees or, further, between approximately 18 and 20 degrees.

The provision of an angled connector allows the connector to require less space length-wise or width-wise within the mobile device than a parallel mounted connector while also requiring less space in the thickness direction than a perpendicularly mounted connector.

In another particular case, the external interface may be provided by a conventional connector and the internal interface may be provided by a daughter printed circuit board connected to the conventional connector.

In still another particular case, the mobile device may further include a battery door and the external interface may be covered by the battery door when the battery door is in a closed position. In this case, the external interface may be accessible via the battery door without removing a battery from the mobile device. Further, the external interface may be accessible via the battery door by partially opening the battery door.

In still another particular case, the connector is positioned on the main printed circuit board such that the external interface of the connector is provided parallel to an exterior wall of the mobile device.

In yet another particular case, the mobile device may further include a battery compartment and the connector may be configured such that, and the predetermined angle may be selected such that, a normal distance from the main printed circuit board to a furthest extent of the connector is about the same as the normal distance from the main printed circuit board to a furthest extent of the battery compartment.

In still yet another particular case, the mobile device may further include a battery compartment and the connector may be a card connector for receiving a removable card. In this case, the card connector may be configured such that, and the predetermined angle may be selected such that, a normal distance from the main printed circuit board to a furthest extent of the removable card is about the same as the normal distance from the main printed circuit board to a furthest extent of the battery compartment.

According to another aspect herein, there is provided a system for a connector for a mobile device, the system including: a connector including an external interface for receiving an external connection and an internal interface configured for connection to a printed circuit board of the mobile device, wherein the internal interface is connected to the external interface and the internal interface is at a predetermined angle with respect to the external interface; a battery compartment; and a battery cover configured to cover the external interface of the connector and the battery compartment, the cover configured such that moving the cover to a first position provides access to the external interface of the connector and moving the cover to a second position provides access to both the external interface and the battery.

In a particular case, the connector may be a card connector for receiving a removable card and the card connector may be configured such that, and the predetermined angle may be selected such that, a normal distance from the printed circuit board to a furthest extent of the removable card, when inserted, is about the same as the normal distance from the printed circuit board to a furthest extent of the battery compartment.

In another particular case, the predetermined angle may be measured between a plane perpendicular to the external interface and a plane parallel to the printed circuit board and the predetermined angle may be between approximately 5 and 85 degrees. In a more particular case, the predetermined angle may be between approximately 15 and 30 degrees or, further, between approximately 18 and 20 degrees.

Some of the embodiments herein make use of a mobile communication device, sometimes referred to herein as a mobile device, that is a two-way communication device with advanced data communication capabilities having the capability to communicate in a wireless or wired fashion with other computing devices. The mobile device may also include the capability for voice communications. Depending on the functionality provided by the mobile device, it may be referred to as a data-messaging device, a cellular telephone with data messaging capabilities, a wireless Internet appliance, or a data communication device (with or without telephony capabilities). Examples of mobile communication devices include cellular phones, cellular smart-phones, wireless organizers, personal digital assistants, handheld wireless communication devices, wirelessly enabled notebook computers and the like. Typically, the mobile device communicates with other devices through a network of transceiver stations. The mobile device may also include the capability to communicate wirelessly with other mobile devices or with accessory devices using personal area networking (PAN) technologies such as infrared, Bluetooth, or the like.

Figure 1:
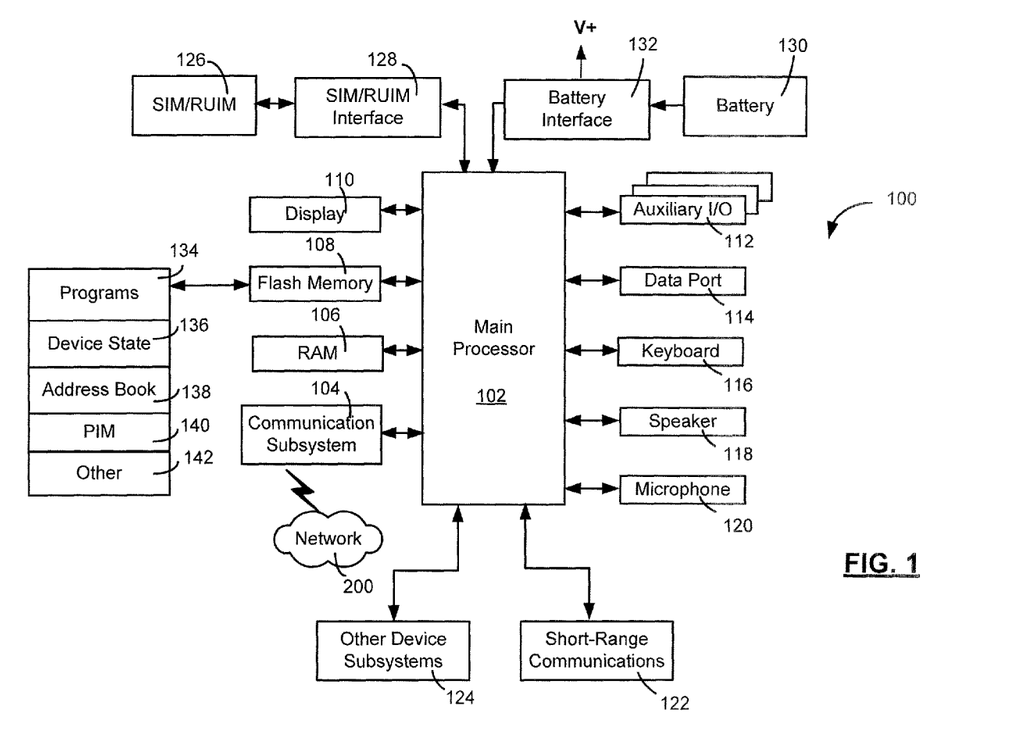
FIG. 1 is a block diagram of an exemplary embodiment of a mobile communication device.

Referring first to FIG. 1, shown therein is a block diagram of a mobile device 100 in one exemplary implementation. The mobile device 100 comprises a number of components, the controlling component being a main processor 102, which controls the overall operation of mobile device 100. Communication functions, including data and voice communications, are performed through a communication subsystem 104. The communication subsystem 104 receives messages from and sends messages to a wireless network 200. In some implementations of the mobile device 100, the communication subsystem 104 is configured in accordance with the Global System for Mobile Communication (GSM) and General Packet Radio Services (GPRS) standards. The GSM/GPRS wireless network is used worldwide. Other standards that can be used include the Enhanced Data GSM Environment (EDGE), Universal Mobile Telecommunications Service (UMTS), Code Division Multiple Access (CDMA), and Intelligent Digital Enhanced Network (iDEN™) standards. New standards are still being defined, but it is believed that they will have similarities to the network behavior described herein, and it will be understood by persons skilled in the art that the embodiments described herein can use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

The main processor 102 also interacts with additional subsystems such as a Random Access Memory (RAM) 106, a flash memory 108, a display 110, an auxiliary input/output (I/O) subsystem 112, a data port 114, a user input system 116, such as a keyboard, a speaker 118, a microphone 120, short-range communications 122, and other device subsystems 124.

Some of the subsystems of the mobile device 100 perform communication-related functions, whereas other subsystems can provide "resident" or on-device functions. By way of example, the display 110 and the user input system 116 can be used for both communication-related functions, such as entering a text message for transmission over the network 200, and device-resident functions such as a calculator or task list. Operating system software used by the main processor 102 is typically stored in a persistent store such as the flash memory 108, which can alternatively be a read-only memory (ROM) or similar storage element (not shown). Those skilled in the art will appreciate that the operating system, specific device applications, or parts thereof, can be temporarily loaded into a volatile store such as the RAM 106.

The mobile device 100 can send and receive communication signals over the wireless network 200 after required network registration or activation procedures have been completed. Network access is associated with a subscriber or user of the mobile device 100. To identify a subscriber, the mobile device 100 may require a SIM/RUIM card 126 (i.e. Subscriber Identity Module or a Removable User Identity Module) to be inserted into a SIM/RUIM interface 128 in order to communicate with a network. Accordingly, the SIM card/RUIM 126 and the SIM/RUIM interface 128 are entirely optional.

The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The main processor 102, in addition to its operating system functions, enables execution of software applications or programs 134 on the mobile device 100. The subset of software applications 134 that control basic device operations, including data and voice communication applications, will normally be installed on the mobile device 100 during its manufacture. The programs 134 can include an email program, a web browser, an attachment viewer, and the like.

The mobile device 100 further includes a device state module 136, an address book 138, a Personal Information Manager (PIM) 140, and other modules 142. The device state module 136 can provide persistence, i.e. the device state module 136 ensures that important device data is stored in persistent memory, such as the flash memory 108, so that the data is not lost when the mobile device 100 is turned off or loses power. The address book 138 can provide information for a list of contacts for the user. For a given contact in the address book, the information can include the name, phone number, work address and email address of the contact, among other information. The other modules 142 can include a configuration module (not shown) as well as other modules that can be used in conjunction with the SIM/RUIM interface 128.

The PIM 140 has functionality for organizing and managing data items of interest to a subscriber, such as, but not limited to, e-mail, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications can also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and can provide enhanced on-device functions, communication-related functions, or both. For example, secure communication applications can enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 may be any suitable port that enables data communication between the mobile device 100 and another computing device. The data port may be a serial or a parallel port. In some instances, the data port 114 may be a USB port that includes data lines for data transfer and a supply line that can provide a charging current to charge the mobile device 100.

The short-range communications subsystem 122 provides for communication between the mobile device 100 and other mobile devices, computer systems or accessory devices, without the use of the wireless network 200. For example, the subsystem 122 can include a wireless transmitter/receiver and associated circuits and components for short-range communication. Examples of short-range communication standards include those developed by the Infrared Data Association (IrDA), Bluetooth, and the 802.11 family of standards developed by IEEE. These short-range communication standards allow the formation of wireless connections between or among mobile devices and accessory devices and, in some cases, allow the formation of personal area networks (PANs) involving several devices. The establishment of short-range communications is described in greater detail below.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the user input system 116 in conjunction with the display 110 and possibly the auxiliary I/O subsystem 112. The auxiliary I/O subsystem 112 can include devices and connectors such as: a touch screen, mouse, track ball, infrared fingerprint detector, a roller wheel with dynamic button pressing capability, headphone jacks, external removable cards, such as memory cards, and the like. The user input system 116 is preferably an alphanumeric keyboard and/or telephone-type keypad. However, other types of keyboards can also be used. A composed item can be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
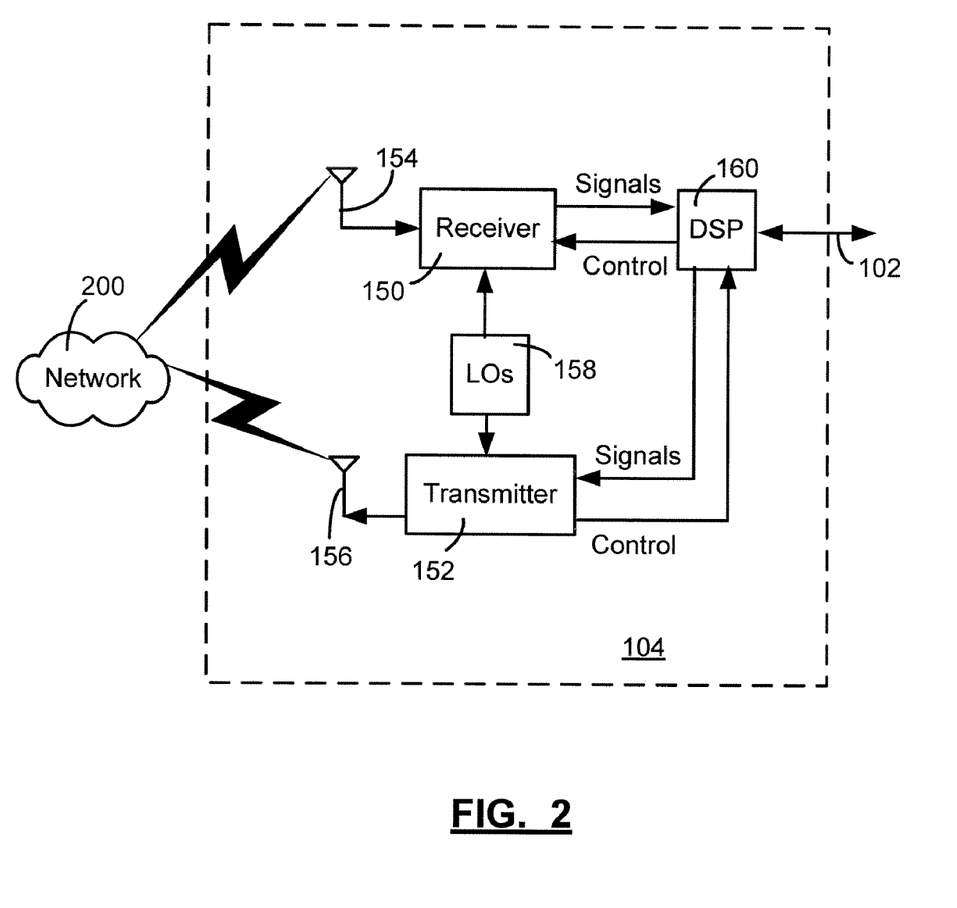
FIG. 2 is a block diagram of an exemplary embodiment of a communication subsystem component of the mobile communication device of FIG. 1.

Referring now to FIG. 2, a block diagram of an exemplary embodiment of the communication subsystem component 104 of FIG. 1 is shown. The communication subsystem 104 comprises a receiver 150 and a transmitter 152, as well as associated components such as one or more embedded or internal antenna elements 154, 156, Local Oscillators (LOs) 158, and a communications processor 160 for wireless communication. The communications processor 160 can be a Digital Signal Processor (DSP). As will be apparent to those skilled in the field of communications, the particular design of the communication subsystem 104 can depend on the communication network with which the mobile device 100 is intended to operate. Thus, it should be understood that the design illustrated in FIG. 2 serves only as an example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed by the communications processor 160. In a similar manner, signals to be transmitted are processed, including modulation and encoding, by the communications processor 160. These processed signals are input to the transmitter 152 for digital-to-analog (D/A) conversion, frequency up conversion, filtering, amplification and transmission over the wireless network 200 via the antenna 156. The communications processor 160 not only processes communication signals, but also provides for receiver and transmitter control. For example, the gain/attenuation applied to communication signals in the receiver 150 and transmitter 152 can be adaptively controlled through automatic gain/attenuation control algorithms implemented in the communications processor 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is sending to the wireless network 200 and is otherwise turned off to conserve resources. Similarly, the receiver 150 is periodically turned off to conserve power until it is needed to receive signals or information (if at all) during designated time periods.

Figure 3:
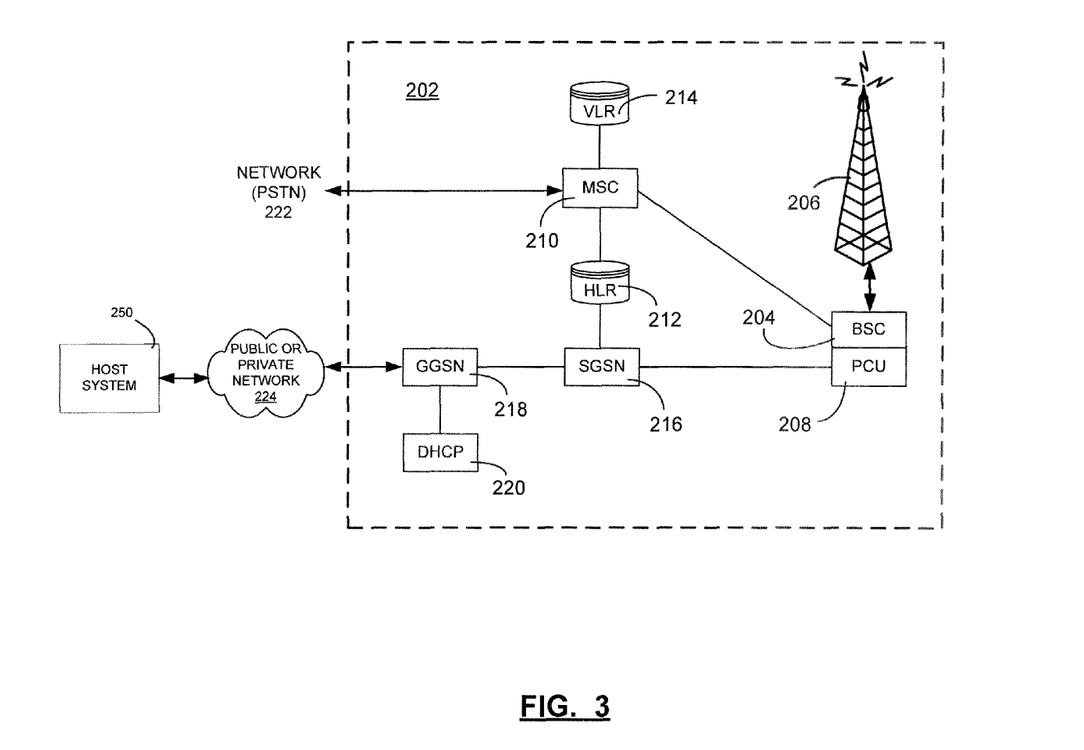

Referring now to FIG. 3, a block diagram of an exemplary embodiment of a node of the wireless network 200 is shown as 202. In practice, the wireless network 200 comprises one or more nodes 202. The mobile device 100 communicates with the node 202. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that can be used in communications through the wireless network 200.

In a GSM network, the MSC 210 is coupled to the BSC 204 and to a landline network, such as a Public Switched Telephone Network (PSTN) 222 to satisfy circuit switching requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 is a fixed transceiver station. The station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. The communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time require less use of computing resources.

The SGSN 216 and GGSN 218 are elements added for GPRS support; namely packet switched data support, within GSM. The SGSN 216 and MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 to be connected to the GGSN 218. There are many mechanisms for dynamic IP assignment, including using a combination of a Remote Authentication Dial-In User Service (RADIUS) server and DHCP server. Once the GPRS Attach is complete, a logical connection is established from the mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the wireless network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) contexts and there are a limited number of these available in the wireless network 200. To maximize use of the PDP Contexts, the wireless network 200 will run an idle timer for each PDP Context to determine if there is a lack of activity. When the mobile device 100 is not using its PDP Context, the PDP Context can be de-allocated and the IP address returned to the IP address pool managed by the DHCP server 220.

Using the above described general mobile device environment as an example environment, the following description relates to connectors and systems for connectors on the mobile device. As described above, the mobile device may include various types of input/output elements and a data port, many of which will require a connector having an external interface on the mobile device, such as USB, headphone jack, external memory, SIM card and the like. Each of these connectors must also have an internal interface that is in contact with a printed circuit board inside the mobile device to provide input/output control and data. In order to reduce the size of the mobile device, connectors that use the least amount of PCB space and that have the least thickness are needed. Generally speaking, in the present application, the embodiments relate to a connector or connectors that are angled, that is, that have an external interface that is angled (that is, not parallel or perpendicular) in relation to the main PCB to which the connector is connected. Typically, this means that the external interface will be angled with respect to an internal interface of the connector that is connected to the PCB. In some cases, the angle of the connector may also be expressed as an angle of a plane perpendicular to the external interface with respect to either the internal interface or the PCB.

Figure 4:
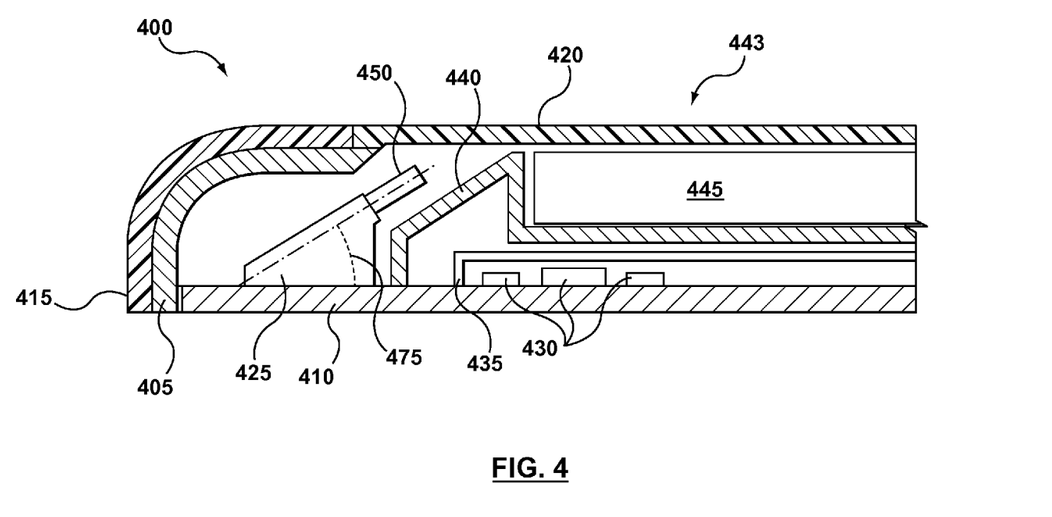
FIG. 4 is a schematic diagram of a portion of a mobile device according to an embodiment herein.

FIG. 4 shows a simplified schematic cross section of a rear portion 400 of a mobile device 100 according to an embodiment herein. The rear portion 400 includes a rear housing 405, a main printed circuit board (PCB) 410 supported in the rear housing 405, a rear cover 415 supported by the rear housing, and a battery cover or door 420 that connects with the rear cover 415 and/or rear housing 405. The main PCB 410 typically lies in a longitudinal plane of the mobile device 100 and supports or includes one or more connectors 425 (one shown), various electrical components 430, and may be provided with one or more shields 435 or support elements 440. Although a mobile device typically includes one main PCB, alternative embodiments may include more than one PCB in a similar plane. In alternate embodiments, the shield 435 or support elements 440 may be provided to the rear housing 405. The support elements 440 typically support a battery compartment 443, in which a battery 445 can be inserted or removed via the battery door 420. The shield 435 shields the electrical components 430 from the battery 445 or the like.

It will be understood that the mobile device 100 will also include a front portion (not shown) that combines with the rear portion 400 to provide other elements of the mobile device 100 such as display screen and the like, however, FIG. 4 and subsequent herein provide a simplified schematic view of the mobile device 100 and elements therein for ease of understanding.

Figure 5:
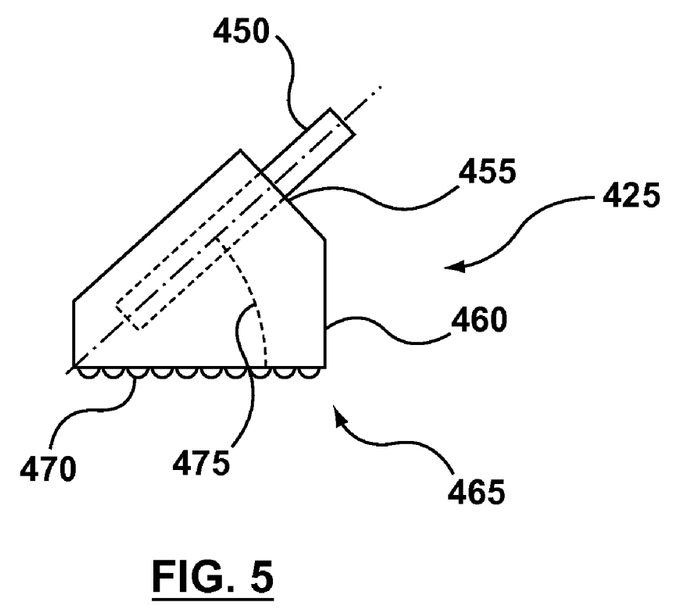
FIG. 5 is a schematic side view of a connector according to an embodiment herein.
Figure 6:
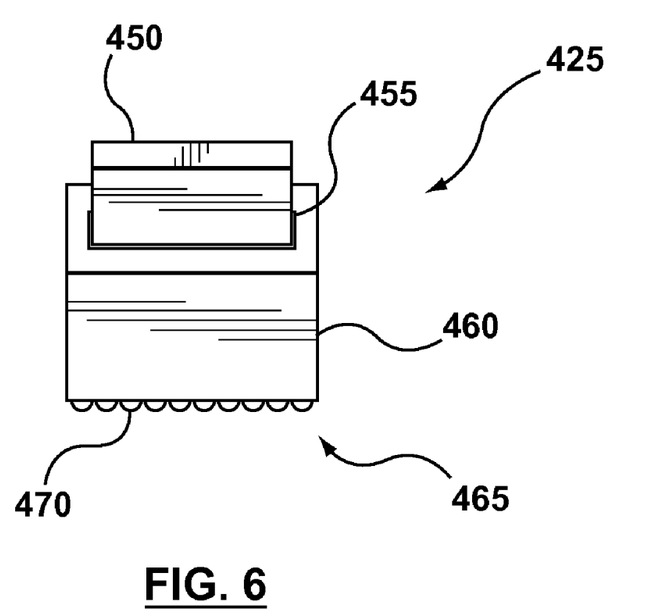
FIG. 6 is a schematic front view of the connector of FIG. 5.

The embodiment of the connector 425 illustrated in FIG. 4 is configured for use with a removable card 450. FIGS. 5 and 6 illustrate further detail of the connector 425.

As shown in FIGS. 5 and 6, the connector 425 includes an external interface 455, typically an opening or slot (and sometimes referred to as an opening), for insertion and removal of the removable card 450. The connector 425 also includes a body 460 and an internal interface 465 to the PCB 410. In this case, the internal interface 465 includes surface mount solder beads 470. The body 460 of the connector is configured such that, when installed, a plane perpendicular to the opening 455 of the connector 425 will be at a predetermined angle 475 to the plane of the PCB 410.

The connector 425 may be a conventional connector (meaning a horizontal or vertical connector with external and internal interfaces generally parallel) mounted on a sub-PCB (not shown) or the like (sometimes called a daughter-board) at an angle and the sub-PCB is then mounted to the PCB 410 of the mobile device 100. In one particular case, the conventional connector may be connected to a flex-PCB, which provides the flexibility to angle the conventional connector, and the flex-PCB is then connected to the main PCB, using, for example a board-to-board (B2B) connector. In this case, the external interface is the external opening of the conventional connector and the internal interface is the connection to the main PCB. It will be understood that in some cases, a connector may extend beyond an end of the PCB and may be connected to the main PCB by a flex-PCB that is connected to a B2B connector at an end of the main PCB.

Alternatively, the connector 425 may be fabricated (as illustrated in FIGS. 4, 5 and 6) such that the internal interface 465 is at an angle to the external interface 455 such that the connector 425 can be mounted to the PCB 410 without the use of a sub-PCB or the like. In either case, the connector 425 may be configured such that the internal interface 465 connects to the PCB 410 by surface mount (as shown in FIGS. 5 and 6) or alternatively by through-hole, spring-mount or related technologies. A connector 425 fabricated to provide an angled connector would allow for a reduction in the number of components required and would reduce the overall manufacturing process for the mobile device 100 because such a connector 425 could be more easily handled by a pick-and-place system. In a further alternative embodiment, the connector 425 may be fabricated such that the angle of the external interface 455 of the connector can be modified following mounting on the PCB 410 to provide for adjustment following installation during manufacturing. Such an arrangement could be formed using flex-PCB techniques similar to those described above.

The angle 475 of the opening 455 of the connector 425 can be selected based on the thickness of the other elements of the mobile device 100, in particular, the battery 445 thickness and the thickness of any shielded electrical circuitry 430,435 or the like. In order to provide a thin mobile device 100, it is preferable to provide a longer and/or wider but thin battery 445 (the length & width of the battery 445 must be larger in order to achieve desired battery capacity as the battery 445 is made thinner (battery volume roughly translates into battery capacity). Using an angled connector 425 (as opposed to conventional parallel or perpendicular connectors) allows the battery 445 to be longer and/or wider and thinner, which results in a thinner mobile device 100. In some embodiments, the angle between a plane perpendicular to the external interface 455 and the plane of the PCB 410 may be any non-parallel or perpendicular angle. In some cases, the angle may be between approximately 5 and 85 degrees. In some embodiments, particularly those involving removable card connectors, the angle may be between approximately 15 and 30 degrees. In still further embodiments, the angle may be between approximately 18 and 20 degrees. In the case of a removable card connector, the connector may be longer to accommodate the length of a card to be inserted, as such, the connector may need to be at a lower angle in order to maintain a desire thickness of the mobile device. Other connectors may have different lengths and, as such, may be at different angles depending on their position in the mobile device. In some cases, the predetermined angle 475 may be selected such that, a normal distance from the main PCB to a furthest extent of the connector is about the same as the normal distance from the main printed circuit board to a furthest extent of the battery compartment. In the case where the connector comprises a card connector for receiving a removable card, the card connector can be configured such that, and the predetermined angle 475 can be selected such that, a normal distance from the main PCB to a furthest extent of the removable card is about the same as the normal distance from the main printed circuit board to a furthest extent of the battery compartment.

The removable card may be any of a variety of removable cards but a particular example is that of an external memory card. Various types of external memory cards are known in the market and may be developed. One example is a micro Secure Digital (μSD) card.

Figure 7:
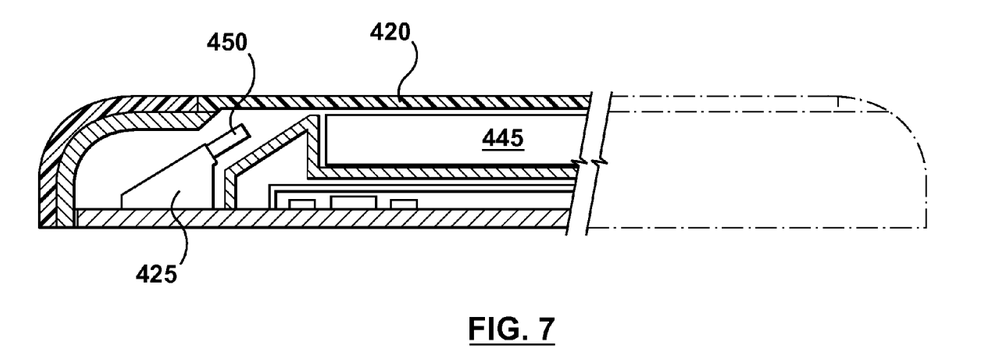
FIG. 7 is a schematic diagram of the mobile device of FIG. 4 with a battery cover in a closed position.
Figure 8:
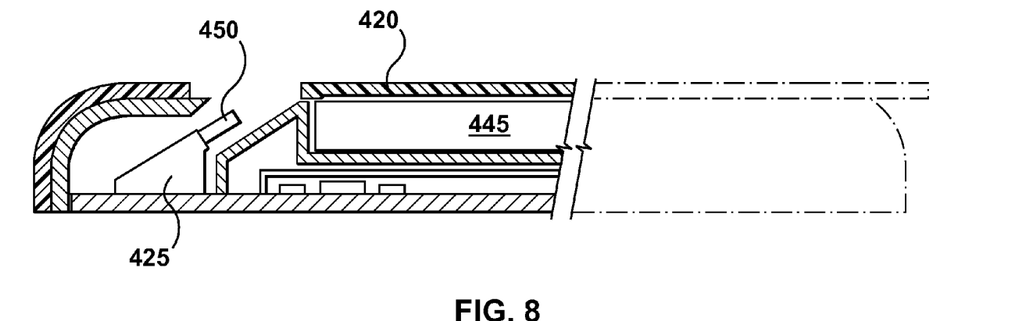
FIG. 8 is a schematic diagram of the mobile device of FIG. 4 with the battery cover in an intermediate position.
Figure 9:
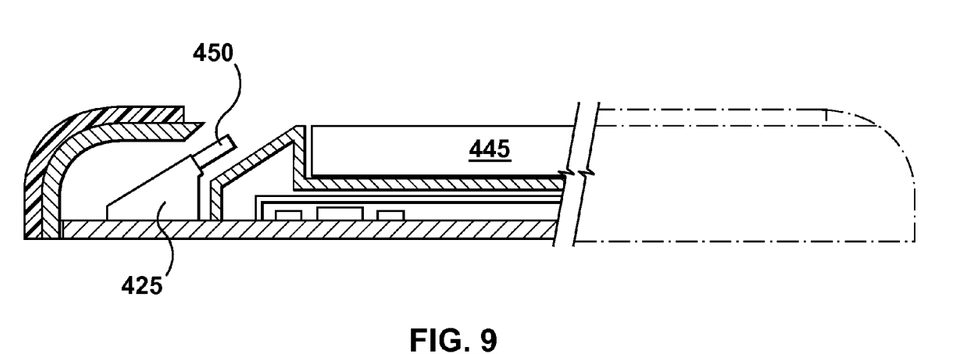
FIG. 9 is a schematic diagram of the mobile device of FIG. 4 with the battery cover in an open position.

FIGS. 7 to 9 illustrate an example embodiment of a system for connectors for the mobile device 100. In FIG. 7, the battery cover 420 of the mobile device 100 is in a closed position in which the battery cover 420 covers the rear housing 405 of the mobile device. In FIG. 8, the battery cover 420 is in an intermediate (or first) position in which the battery cover 420 has been moved (in this embodiment by sliding) relative to the rear housing 405 of the mobile device 100. In the intermediate position, the user may have access to the opening 455 of the connector 425 to allow insertion and removal of the removable card 450. In particular, the removable card 450 can be hot-swapped without removing the battery 440 from the mobile device 100. It will be understood that the connector 425 may be a push-push, push-pull, or other type of connector and the access to the connector opening 455 can be arranged appropriately. In FIG. 9, the battery cover 420 is in an open (or second) position in which the battery cover 420 has been moved relative to the rear housing 405 to allow insertion or removal of the battery 440. In some cases, the battery cover 420 may be removed completely from the rear housing 405 to provide the open position. In this open position, the removable card 450 may also be inserted or removed. In an alternate embodiment, the battery door 420 may be configured to move, for example, by sliding, one direction to allow access to the battery 440 and another direction to allow access to the opening 455 of the connector 425. In any event, the user of the mobile device 100 does not need to fully open the battery cover 420 or remove the battery 440 to access the connector.

In the embodiments above, the angled connector 425 is provided beneath a battery cover 420. It will be understood that a separate cover (not shown) may be supplied for the connector 425 or there may be no cover.

Figure 10:
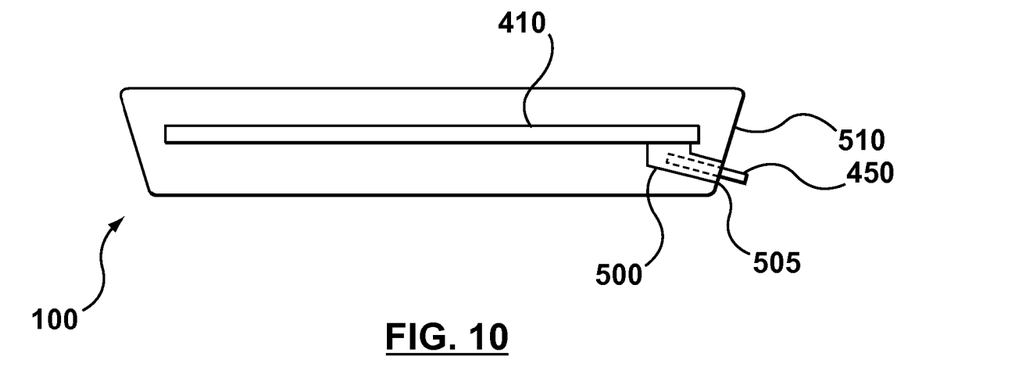
FIG. 10 is a schematic diagram illustrating another embodiment of a mobile device comprising a connector such as that of FIGS. 5 and 6.

In some cases, an angled connector such as that shown in FIGS. 5 and 6 can provide additional opportunities for alternative arrangements of connectors on mobile devices. As shown in FIG. 10, an angled connector 500 can also allow for the connector opening (external interface) 505 to be more easily positioned on an angled edge 510 of the mobile device 100. In particular, the use of an angled connector 500 allows the connector opening 505 to be parallel to the edge 510 of the mobile device 100, which is also at an angle with respect to the PCB 410, that is, the connector is perpendicular to the edge 510 of the mobile device 100. It is useful to have the opening remain parallel to the edge in order to facilitate insertion and removal of the removable card 450 or the like because a user will generally expect that a connector will be inserted perpendicular to the surface that the opening is positioned on. This arrangement also assists with the industrial design of the mobile device 100 because a mobile device 100 with angled or rounded edges 510 generally appears thinner to consumers and may also provide ergonomic benefits.

Figure 11:
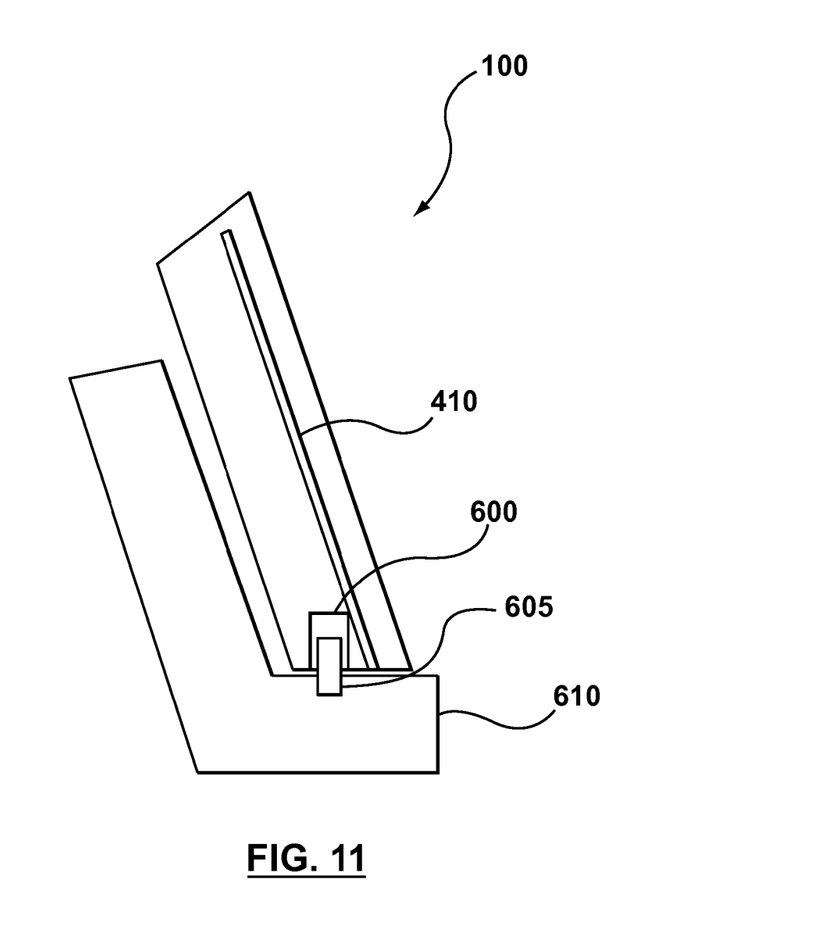
FIG. 11 is a schematic diagram illustrating another embodiment of a mobile device comprising a connector such as that of FIGS. 5 and 6.

In a similar way, the use of an angled connector could provide additional options for the configuration of mobile devices and docking stations or the like. In particular, the mobile device could be placed on a docking station in such a way that an angled connector could engage with an appropriately positioned connector on the docking station at angles other than perpendicular or parallel to the PCB of the mobile device. A schematic example of the use of a connector similar to that of FIGS. 5 and 6 in a system of connectors for docking is shown in FIG. 11. In particular, the use of an angled connector 600, in this case a USB plug, can connect with a matching USB plug 605 on a docking station or charging base 610 by placing the mobile device 100 vertically onto the charging base 610 even though the mobile device is angled.

Having outlined the general approach to the connector and systems for connectors above, it will be understood that there are various types of connectors, including input/output connectors, accessory connectors, charging connectors and the like, including examples such as memory card readers, SIM card readers, USB ports, headphone ports, charging ports and the like that may also be designed or manufactured to be at an angle to allow similar benefits.

It will be understood that other embodiments will be apparent to those skilled in the art based on the disclosure of the above embodiments. For example, it will be apparent that the present disclosure is not intended to be limited to only a single connector, but that other connectors could be similarly angled and, further, could be provided under the battery cover or at other locations on the mobile device.

It should be understood that various other modifications can be made to the exemplary embodiments described and illustrated herein, without departing from the general scope of the appended claims. In particular, it should be understood that while the embodiments have been described for mobile communication devices, the embodiments are generally applicable to electronic devices that are desired to be as thin as possible.

We claim:

1. A mobile device comprising a main printed circuit board, a battery door and a connector for receiving an external connection, the connector comprising:
   an external interface for receiving the external connection wherein the external interface is covered by the battery door when the battery door is in a closed position; and
   an internal interface configured for connection to the main printed circuit board,
   wherein the internal interface is connected to the external interface and the external interface is at a predetermined angle with respect to the main printed circuit board.

2. A mobile device according to claim 1, wherein the connector comprises a removable card connector and the external interface comprises a card slot.

3. A mobile device according to claim 1, wherein the connector comprises a USB connector and the external interface comprises a USB port.

4. A mobile device according to claim 1, wherein the predetermined angle is measured between a plane perpendicular to the external interface and a plane parallel to the main printed circuit board and the predetermined angle is between approximately 5 and 85 degrees.

5. A mobile device according to claim 4, wherein the predetermined angle is between approximately 15 and 30 degrees.

6. A mobile device according to claim 1, wherein the external interface is accessible via the battery door without removing a battery from the mobile device.

7. A mobile device according to claim 1, wherein the external interface is accessible via the battery door by partially opening the battery door.

8. A mobile device according to claim 1, wherein the connector is positioned on the main printed circuit board such that the external interface of the connector is provided parallel to an exterior wall of the mobile device.

9. A mobile device according to claim 1, wherein the mobile device further comprises a battery compartment and wherein the connector is configured such that, and the predetermined angle is selected such that, a normal distance from the main printed circuit board to a furthest extent of the connector is about the same as the normal distance from the main printed circuit board to a furthest extent of the battery compartment.

10. A mobile device according to claim 1, wherein the mobile device further comprises a battery compartment and wherein the connector comprises a card connector for receiving a removable card, the card connector configured such that, and the predetermined angle is selected such that, a normal distance from the main printed circuit board to a furthest extent of the removable card is about the same as the normal distance from the main printed circuit board to a furthest extent of the battery compartment.

11. A system for a connector for a mobile device, the system comprising:
    a connector comprising: an external interface for receiving an external connection; and an internal interface configured for connection to a printed circuit board of the mobile device; wherein the internal interface is connected to the external interface and the internal interface is at a predetermined angle with respect to the external interface;
    a battery compartment; and
    a battery cover configured to cover the external interface of the connector and the battery compartment, the cover configured such that moving the cover to a first position provides access to the external interface of the connector and moving the cover to a second position provides access to both the external interface and the battery.

12. A system according to claim 11, wherein the connector comprises a card connector for receiving a removable card, the card connector configured such that, and the predetermined angle is selected such that, a normal distance from the printed circuit board to a furthest extent of the removable card, when inserted, is about the same as the normal distance from the printed circuit board to a furthest extent of the battery compartment.

13. A system according to claim 11, wherein the predetermined angle is measured between a plane perpendicular to the external interface and a plane parallel to the printed circuit board and the predetermined angle is between approximately 5 and 85 degrees.

14. A system according to claim 12, wherein the predetermined angle is between approximately 15 and 30 degrees.

* * * * *